United States Patent [19]

Beall et al.

[11] 4,084,974

[45] Apr. 18, 1978

[54] METHOD OF MAKING LIGHT-ABSORBING GLASS-CERAMIC ARTICLES

[75] Inventors: George H. Beall, Big Flats; Hermann L. Rittler, Horseheads, both of N.Y.

[73] Assignee: Corning Glass Works, Corning, N.Y.

[21] Appl. No.: 817,925

[22] Filed: Jul. 22, 1977

[51] Int. Cl.² .................... C03B 32/00; C03C 3/22
[52] U.S. Cl. .................... 106/39.7; 65/32; 65/33; 106/39.8; 106/52
[58] Field of Search ............ 65/32, 33; 106/39.7, 106/39.8, 48

[56] References Cited

U.S. PATENT DOCUMENTS

| | | |
|---|---|---|
| 1,919,264 | 7/1933 | Taylor .................... 106/54 |
| 3,634,111 | 1/1972 | Foster et al. .................... 106/39.7 |
| 3,788,997 | 1/1974 | MacKenzie .................... 106/48 |
| 3,854,919 | 12/1974 | Pirooz .................... 65/32 |
| 4,009,042 | 2/1977 | Rittler .................... 106/39.7 |
| 4,030,903 | 6/1977 | Rittler .................... 65/32 |

Primary Examiner—Helen M. McCarthy
Attorney, Agent, or Firm—Kees van der Sterre; Clinton S. Janes, Jr.; Clarence R. Patty, Jr.

[57] ABSTRACT

Light-absorbing glass-ceramic articles comprising beta-spodumene and/or beta-quartz as the principal crystal phase and exhibiting blue-to-black coloration are provided by adding a glass reducing agent to a titanium-containing lithium aluminosilicate glass batch for the parent glass.

4 Claims, No Drawings

METHOD OF MAKING LIGHT-ABSORBING GLASS-CERAMIC ARTICLES

BACKGROUND OF THE INVENTION

The present invention is in the field of glass-ceramics and particularly relates to the manufacture of light-absorbing glass-ceramic products which are blue-to-black in color.

Black glasses are well known and are ordinarily produced by the use of coloring agents such as cobalt, nickel, manganese, chromium, iron and the like. The use of titanium as a colorant in glass is noted in U.S. Pat. No. 1,919,264, which teaches that black borosilicate glasses can be produced by adding iron, titanium and, preferably, a reducing agent such as starch to the glass batch.

Glass-ceramic materials are crystalline or semicrystalline materials produced by the in situ crystallization of glasses. Crystallization is accomplished in accordance with a process comprising, first, compounding and melting a batch for a glass which includes nucleating agents to promote glass crystallization; secondly, forming the melt into a glass article of the desired configuration; and thirdly, heat treating the glass article in accordance with a time-temperature schedule which promotes the formation of crystal nuclei and the subsequent growth of crystals thereon as the treatment proceeds. This process provides a product composed of highly crystalline material wherein the crystals are uniform in size, fine-grained, and evenly distributed throughout a minor residual glassy matrix.

The proportion of crystals in most glass-ceramic materials is quite high, being over 50% and usually over 75% by weight. Hence glass-ceramic materials typically exhibit properties more closely related to those of the crystal phase than to those of the parent glass. A good general discussion of the principles underlying the manufacture of glass-ceramics is found in U.S. Pat. No. 2,920,971 to Stookey, and reference may be made to this patent and to numerous other publications for further information relating to this field.

The in situ crystallization of glasses in the $Li_2O$-$Al_2O_3$-$SiO_2$ composition field in accordance with the above-described procedures can provide highly crystalline glass-ceramics wherein beta-quartz and/or betas-podumene constitutes the principal crystal phase. Such glass-ceramics have properties making them especially useful for high temperature and temperature cycling applications. The relatively high strength and low linear coefficient of thermal expansion of these materials make them prticularly resistant to breakage by thermal shock.

Beta-quartz and beta-spodumene glass-ceramics containing $TiO_2$ as a nucleating agent have been reported in a number of issued patents, including U.S. Pat. Nos. 2,960,801; 3,148,994; 3,157,522; 3,380,818; 3,625,718; 4,018,612 and many others. The appearance of such glass-ceramics can be varied by varying composition and heat treatment; hence transparent, translucent or opaque glass-ceramics which are water-white, opaque white or variously colored have been produced and described in the prior art.

A black glass-ceramic material capable of absorbing visible and near infrared radiation would have utility for a variety of technical and consumer-related applications, including, for example, stove-tops, cookware, open viewports, dark protective lenses and the like. Transparent black materials would be useful for viewport applications, whereas cookware could be fabricated from black opaque materials.

It is the principal object of the present invention to provide a convenient and efficient method for producing blue-to-black beta-spodumene and/or beta-quartz glass-ceramic materials without requiring the use of added oxide coloring constituents having possible adverse effects on glass-ceramic properties.

It is a further object of the invention to provide black glass-ceramics containing beta-spodumene and/or beta-quartz as the principal crystal phase, produced by the method hereinafter set forth.

Other objects and advantages of the invention will become apparent from the following description thereof.

SUMMARY OF THE INVENTION

We have now discovered that blue-to-black beta-quartz and beta-spodumene glass-ceramic articles may be produced without the use of conventional coloring oxides by adding a glass reducing agent to a titanium-containing glass batch for the parent glass. Titanium dioxide ($TiO_2$) is a nucleating agent commonly used in such batches to provide nuclei for the subsequent crystallization in situ of the glass. At batch melting temperatures, glass reducing agents can reduce $Ti^{+4}$ present in the melt to $Ti^{+3}$, a species which is highly absorptive of visible light and thus imparts a blue-to-black coloration to the glass-ceramic product.

Broadly, the method of the present invention comprises the initial step of compounding a batch for a lithium aluminosilicate glass which is thermally crystallizable to beta-quartz or beta-spodumene, the batch also containing a source of $TiO_2$ as a nucleating agent. The batch further includes a glass reducing agent in an amount at least sufficient to reduce at least some of the $Ti^{+4}$ species present in the batch ($TiO_2$, titanate compounds or the like) to $Ti^{+3}$ species.

Following batch formulation and compounding as described, the batch is melted to form a glass comprising the desired $Ti^{+3}$ species and the melt is formed into a glass article of a selected configuration. Thereafter the glass article is heat-treated to obtain crystallization in situ to a glass-ceramic article comprising a principal crystal phase consisting of beta-spodumene and/or beta quartz. The crystallized glass-ceramic article contains $Ti^{+3}$ species and is blue-to-black in color. It may be transparent or opaque depending upon composition, heat treatment, and the identity and microstructure of the crystal phases present therein.

The intensity of coloration can be controlled by adjusting the amount of glass reducing agent employed, and thus the concentration of $Ti^{+3}$ species in the product. Also, of course, different shadings of coloration may be obtained through the optional supplemental use of known glass colorants such as $NiO$, $Co_3O_4$, and the like.

DETAILED DESCRIPTION

The lithium aluminosilicate glass selected for processing in accordance with the invention may be any glass thermally crystallizable to beta-quartz, beta-spodumene, or solid solutions thereof. Many such glasses are known, as illustrated by the aforementioned patents relating to lithium aluminosilicate glass-ceramics.

The particular crystal phase produced by the crystallization in situ of a lithium aluminosilicate glass depends on composition and also to a great extent on heat treatment. For example, in lithium aluminosilicate glasses wherein the molar ratio $Li_2O:Al_2O_3:SiO_2$ is within the range of about 1:1:4 to about 1:1:9, crystallization in situ at temperatures of about 850° C. tends to produce glass-ceramics wherein beta-quartz constitutes the principal crystal phase, whereas crystallization at temperatures of about 1100° C. tends to produce white opaque glass-ceramics wherein beta-spodumene constitutes the principal crystal phase. Hence light-absorbing glass-ceramics containing beta-quartz, beta-spodumene, or a mixture thereof as the principal crystal phase may be produced in accordance with the present invention.

Although any of the well-known lithium aluminosilicate glass compositions can be converted to light-absorbing glass-ceramics as described, the use of lithium aluminosilicate glasses in the $Li_2O$-$MgO$-$ZnO$-$l_2O_3$-$SiO_2$ composition field is preferred. As is well known, such compositions can provide beta-spodumene glass-ceramics which exhibit good strength, a low coefficient of thermal expansion, and good dimensional stability at high temperatures.

The source of $TiO_2$ which is incorporated into the batch as a nucleating agent is typically pure $TiO_2$; however, other compounds of titanium could also be employed. Of course, nucleating agents other than $TiO_2$ such as $ZrO_2$, $P_2O_5$ or the like may also be included in the glass batch, if desired.

Many glass reducing agents are known which, when added in small quantities to a glass batch, are capable of converting metal oxide species present in the glass to a reduced or metallic state. Examples of such agents are carbon, carbonaceous organic compounds such as starch, sugar, oxalates or the like, and metals such as silicon or aluminum.

Tetravalent titanium is quite susceptible to reduction to trivalent titanium in glass at ordinary melting temperatures. Therefore any of the known glass reducing agents, when added to a titanium-containing lithium aluminosilicate glass batch, will reduce $Ti^{+4}$ species present in the glass melt to light-absorbing $Ti^{+3}$ species (e.g. titanium ions or the sub-oxides of titanium).

The amount of glass reducing agent added to the batch is not critical provided an amount at least sufficient to reduce some of the $Ti^{+4}$ species present in the glass to $Ti^{+3}$ species is used. Where the glass reducing agent is a carbonaceous material selected from the group consisting of carbon, sugar and starch, an addition of about 0.5-2% by weight of reducing agent, as calculated from the total weight of the glass batch, is preferred. The colors produced by such an addition will normally range from blue or gray to intense black, depending upon the extent of titanium reduction resulting therefrom and the degree of opacity or transparency of the product.

The glass batch containing $TiO_2$ and a glass reducing agent may be compounded of conventional glass batch constituents and may be melted in conventional melting units such as pots, tanks or crucibles at temperatures customarily employed for melting such glasses. The melts may then be formed into glass articles of a selected configuration by pressing, rolling, casting, blowing, or any of the various other glass-forming techniques which are well known in the art.

Notwithstanding the presence of $Ti^{+3}$ species in the formed glass article, crystallization in situ thereof by heat treatment to provide a light-absorbing glass-ceramic product may be carried out in accordance with conventional procedures. Hence the glass is suitably heated at a temperature somewhat above its annealing point for a time at least sufficient to develop crystal nuclei therein, and is then further heated, usually at a higher temperature between the glass annealing and glass softening points, to develop the beta-quartz and/or beta-spodumene crystal phase therein.

Light-absorbing glass-ceramic articles produced in accordance with the invention typically exhibit physical properties quite analogous to white or transparent glass-ceramics of similar composition and microstructure. Thus products exhibiting good strength, low thermal expansion, and a fine-grained fracture are readily obtained.

Some examples of specific batch compositions useful for producing black glass-ceramic articles in accordance with the invention are set forth in Table I below. The compositions are reported in parts by weight on the oxide basis. Also reported in Table I are the appearances of glasses having the indicated compositions after melting at 1600° C. in silica crucibles, casting into glass patties, and annealing at 700° C.

TABLE I

| | Glasses | | | | |
|---|---|---|---|---|---|
| | 1 | 2 | 3 | 4 | 5 |
| $SiO_2$ | 67.4 | 67.4 | 67.4 | 67.4 | 67.4 |
| $Al_2O_3$ | 20.4 | 20.4 | 20.4 | 20.4 | 20.4 |
| $Li_2O$ | 3.5 | 3.5 | 3.5 | 3.5 | 3.5 |
| ZnO | 1.2 | 1.2 | 1.2 | 1.2 | 1.2 |
| MgO | 1.6 | 1.6 | 1.6 | 1.6 | 1.6 |
| $TiO_2$ | 4.8 | 4.8 | 4.8 | 4.8 | 4.8 |
| $As_2O_3$ | 0.4 | 0.4 | 0.4 | 0.4 | 0.4 |
| F | 0.23 | 0.23 | 0.23 | 0.23 | 0.23 |
| Sugar | 0.5 | 1.0 | 2.0 | 2.0 | 1.0 |
| NiO (b) | — | — | 0.1 | — | — |
| NiO(g) | — | — | — | 0.1 | 0.5 |
| $Co_3O_4$ | — | — | — | — | 0.06 |
| Glass Appearance | blue-gray, transparent | blue, transparent | brown-black, transparent | black, opaque | gray-black, opaque |

Glasses such as shown in Table I may be crystallized in situ to glass-ceramic articles wherein beta-quartz constitutes the principal crystal phase utilizing a heat treatment at temperatures on the order of about 850° C. Table II below reports the appearance and some of the optical properties of glass-ceramics produced by the crystallization in situ of glasses having compositions such as shown in Table I, using a crystallization heat treatment comprising a hold of 1 hour at a nucleation temperature of 780° C. followed by a crystallization hold of 2 hours at 850° C.

The optical properties reported in Table II comprise transmittance measurements taken through samples of each glass-ceramic product at several wavelengths in the visible and infrared wavelength range. All reported values are with respect to a sample thickness of 4.2 millimeters.

TABLE II

| | Glass-Ceramics | | | | |
|---|---|---|---|---|---|
| Glass No. | 1 | 2 | 3 | 4 | 5 |
| Glass-Ceramic Appearance | black | black | black | black | green-black |
| Transmittance at: | | | | | |
| 450 nm | 0.8 | 0 | 0 | 0 | 0 |
| 750 nm | 0.8 | 0 | 0 | 0 | 0 |
| 1 μm | 0.12 | 0 | 0 | 0 | 0 |
| 2 μm | 0.60 | 0.01 | 0.1 | 0.02 | 0 |
| 2.5 μm | 0.68 | 0.01 | 0.22 | 0.06 | 0.02 |
| 3.5 μm | 0.33 | 0 | 0.21 | 0.09 | 0.12 |

Glasses such as shown in Table I may also be crystallized in situ to glass-ceramic articles wherein beta-spodumene constitutes the principal crystal phase. This is accomplished by utilizing a crystallization heat treatment wherein peak crystallization temperatures are on the order of about 1100° C. Table III below reports the appearance and some of the physical properties of beta-spodumene glass-ceramics produced by the heat treatment of glasses such as shown in Table I, using a process comprising a nucleation hold of 1 hour at 780° C. and a crystallization hold of 1 hour at 1100° C.

The physical properties reported in Table III include the linear coefficient of thermal expansion of each material, reported as an average over the temperature range 25°–600° C., and the abraded modulus of rupture strength of each material as determined from bar samples thereof. All of the glass-ceramic materials described in Table III experience relatively low distortion during crystallization in situ, and all exhibit a very fine-grained fracture when broken.

TABLE III

| Glass No. | Glass-Ceramics | | | | |
|---|---|---|---|---|---|
| | 1 | 2 | 3 | 4 | 5 |
| Glass-Ceramic Appearance | glossy white, opaque | glossy gray, opaque | glossy blue, opaque | glossy gray, opaque | glossy lavender, opaque |
| Modulus of Rupture Stength (psi) | 19,200 | 16,600 | 16,300 | 16,300 | 14,600 |
| Average Linear Exp. Coefficient (heating, 25 – 600° C) | $17.6 \times 10^{-7}/°$ C. | $7.6 \times 10^{-7}/°$ C. | $7.1 \times 10^{-7}/°$ C. | $8.6 \times 10^{-7}/°$ C. | $4.1 \times 10^{-7}/°$ C. |

From a study of the data set forth in Tables II and III it is apparent that the color as well as the microstructure of glass-ceramic products produced in accordance with the invention may be varied by varying the amount of reducing agent employed and/or the heat treatment used to promote the crystallization of the glass. Color may also be varied by the addition of optional transition metal colorants such as nickel oxide and cobalt oxide.

In general, the colors induced in the glass-ceramic product progress toward lighter blue or grey from dark blue or black as the opacity of the product increases. However black glass-ceramics which are essentially opaque to visible light may be provided through the use of appropriate compositions and heat treatment, as illustrated by Example 3 in Table II above. Thus it is apparent that a wide variety of light-absorbing glass-ceramics containing $Ti^{+3}$ and a principal beta-spodumene and/or beta-quartz crystal phase may be provided within the scope of the invention as defined by the appended claims.

We claim:
1. A method for producing a light-absorbing glass-ceramic article exhibiting blue-to-black coloration wherein beta-quartz and/or beta-spodumene constitutes the principal crystal phase which comprises the steps of:
   (a) compounding a batch for a lithium aluminosilicate glass which is thermally crystallizable to beta-quartz or beta-spodumene, said batch including a source of $TiO_2$ as a nucleating agent and a glass reducing agent in an amount at least sufficient to reduce at least some of the $Ti^{+4}$ species present in the batch to $Ti^{+3}$ species at batch melting temperatures, wherein the glass reducing agent is a carbonaceous reducing agent selected from the group consisting of carbon, sugar and starch;
   (b) melting the batch to form a glass melt containing $Ti^{+3}$ species and forming a glass article from the melt; and
   (c) heat-treating the glass article to obtain crystallization in situ thereof to a light-absorbing glass-ceramic article exhibiting blue-to-black coloration and comprising beta-quartz and/or beta-spodumene as the principal crystal phase and $Ti^{+3}$ species as a colorant.

2. A method in accordance with claim 1 wherein the lithium aluminosilicate glass is a glass in the $Li_2O$-$MgO$-$ZnO$-$Al_2O_3$-$SiO_2$ composition field.

3. A method in accordance with claim 1 wherein the glass reducing agent is added to the batch in an amount constituting about 0.5–2% by weight of the batch.

4. A light-absorbing glass-ceramic article produced in accordance with the method of claim 1.

* * * * *